United States Patent
Elizov et al.

(10) Patent No.: US 11,595,576 B2
(45) Date of Patent: Feb. 28, 2023

(54) USING AN IMAGE SENSOR FOR ALWAYS-ON APPLICATION WITHIN A MOBILE DEVICE

(71) Applicant: SAMSUNG ELECTRONICS CO., LTD., Suwon-si (KR)

(72) Inventors: Roee Elizov, Herzliya (IL); Yoel Yaffe, Modiin (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 16/996,079

(22) Filed: Aug. 18, 2020

(65) Prior Publication Data
US 2022/0060623 A1   Feb. 24, 2022

(51) Int. Cl.
*H04N 5/232* (2006.01)
*G06F 3/01* (2006.01)
*G06T 7/00* (2017.01)

(52) U.S. Cl.
CPC ......... *H04N 5/23245* (2013.01); *G06F 3/017* (2013.01); *G06T 7/0012* (2013.01); *H04N 5/232411* (2018.08); *G06T 2207/30201* (2013.01)

(58) Field of Classification Search
CPC ......... H04N 5/232411; H04N 5/23241; H04N 5/23219; H04N 5/222
See application file for complete search history.

(56) References Cited

U.S. PATENT DOCUMENTS

| | | | |
|---|---|---|---|
| 6,005,613 A * | 12/1999 | Endsley | H04N 5/23206 348/E5.042 |
| 2014/0118257 A1* | 5/2014 | Baldwin | G06F 3/038 345/158 |
| 2015/0199287 A1 | 7/2015 | Sengoku | |
| 2016/0364353 A1 | 12/2016 | Sengoku | |
| 2017/0104733 A1 | 4/2017 | Thanigasalam | |
| 2019/0222756 A1* | 7/2019 | Moloney | H04N 5/232411 |

* cited by examiner

*Primary Examiner* — Ahmed A Berhan (57) ABSTRACT

A mobile device includes an application processor and an image sensor. The application processor includes an imaging subsystem configured to process high resolution image data through a first interface and a sensor hub configured to process sensor data through a second interface. The image sensor operates in one of first and second modes. The image sensor is configured to capture the high resolution image data in response to a request from the imaging subsystem and the imaging subsystem is configured to access the high resolution image data using the first interface for performing a first operation, during the first mode. The image sensor is configured to capture low resolution image data and the sensor hub is configured to access the low resolution image data using the second bus for performing a second operation, during the second mode.

16 Claims, 12 Drawing Sheets

USING AN IMAGE SENSOR FOR ALWAYS-ON APPLICATION WITHIN A MOBILE DEVICE

TECHNICAL FIELD

Exemplary embodiments of the present inventive concept relate to an image sensor of a mobile device.

DISCUSSION OF RELATED ART

Mobile devices such as smart-phones include ultra low power (ULP) sensors such as accelerometers, magnetometers, and gyroscopes that may continue to operate during a low-power state. A mobile device may exit a normal-power state to enter the low-power state to conserve on battery power. Various components of the mobile device can be powered down. Power maybe re-applied to these components upon the mobile device determining that some condition has been met and switching from the low-power state to the normal-power state. For example, the condition could be met when some threshold is reached based on an analysis of sensor data received from the sensors. However, the condition may not be met when there is insufficient sensor data. Smartphones typically include one or more cameras, each having one or more images sensors. However, these image sensors do not operate in an ULP mode and do not provide image data in the low-power state.

SUMMARY

Embodiments of the disclosure allow an image sensor of a mobile device to be used as an ULP sensor.

According to an exemplary embodiment of the inventive concept, a mobile device includes an application processor and an image sensor. The application processor includes an imaging subsystem configured to process high resolution image data through a first interface and a sensor hub configured to process sensor data through a second interface. The image sensor operates in one of first and second modes. The image sensor is configured to capture the high resolution image data in response to a request from the imaging subsystem and the imaging subsystem is configured to access the high resolution image data using the first interface for performing a first operation, during the first mode. The image sensor is configured to capture low resolution image data and the sensor hub is configured to access the low resolution image data using the second interface for performing a second operation, during the second mode. In an exemplary embodiment, the first operation is the default operation of the image sensor. For example, prior to being specially configured to perform the second operation, the image sensor would only perform the first operation.

According to an exemplary embodiment of the inventive concept, an application processor includes a sensor hub and an imaging subsystem. The imaging subsystem is configured to process high resolution image from an image sensor through a first interface during a first mode. The sensor hub is configured to process sensor data from at least one non-image sensor and low resolution image data from the image sensor through a second interface. The sensor hub is configured to determine whether to exit a sleep state from an analysis of the sensor data and the low resolution image data during a second other mode.

According to an exemplary embodiment of the inventive concept, an image sensing device includes an image sensor. The image sensor includes a pixel array and a correlated-double-sampler (CDS). The CDS is configured to sample an image signal provided from the pixel array at a first frequency in response to receipt of a control signal from an application processor indicating a first mode to generate high resolution image data and at a second frequency lower than the first frequency when the control signal indicates a second mode different from the first mode to generate low resolution image data. The image sensor provides the high resolution image data to a first bus connected to the application processor during the first mode. The image sensor provides the low resolution image data to a second bus connected to the application processor during the second mode.

According to an exemplary embodiment of the inventive concept, a method of operating an image sensor of a mobile device includes: an application processor of the mobile device transmitting a control signal to the image sensor indicating whether the mobile device is in a low-power state or a normal-power state; the image sensor generating low resolution image data, when the control signal indicates the mobile device is in the low-power state; and the image sensor generating high resolution image data, when the image sensor receives a request from the application processor and the control signal indicates the mobile device is in the normal mode.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Exemplary embodiments of the present inventive concept will be described more fully hereinafter with reference to the accompanying drawings. Like reference numerals may refer to like elements throughout the accompanying drawings.

It should be understood that descriptions of features or aspects within each exemplary embodiment should typically be considered as available for other similar features or aspects in other exemplary embodiments, unless the context clearly indicates otherwise. As used herein, the singular forms "a", "an" and "the" are intended to include the plural forms as well, unless the context clearly indicates otherwise.

Figure 1:
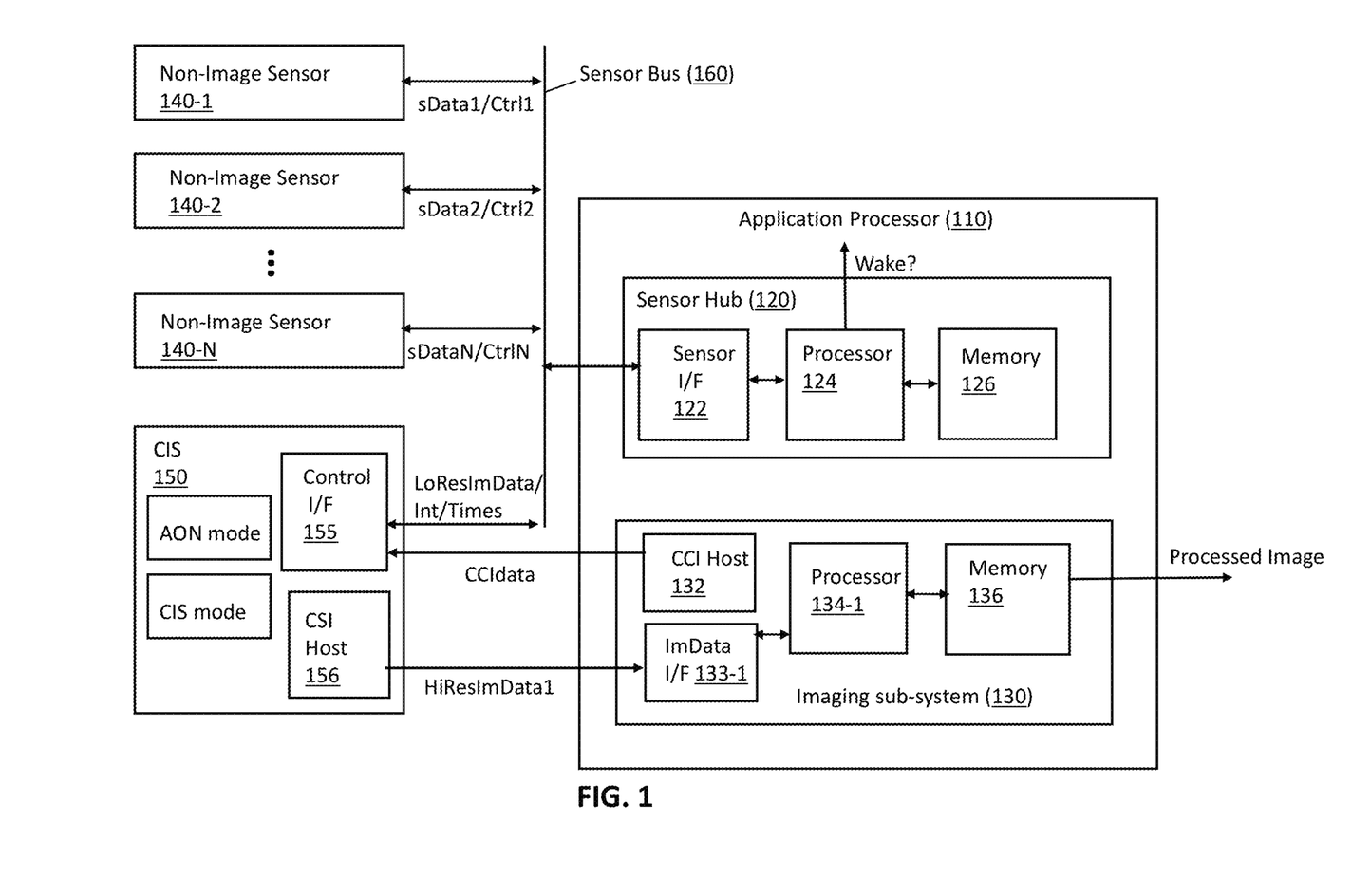
FIG. 1 is a block diagram illustrating a portion of a mobile device, according to an exemplary embodiment of the inventive concept.

FIG. 1 is a block diagram illustrating a portion of a mobile device, according to an exemplary embodiment of the inventive concept. For example, the mobile device may be a smart-phone or a tablet computer but is not limited thereto.

Referring to FIG. 1, the portion includes an application processor 110, an image sensor 150, and non-image sensors (e.g., 140-1, 140-2, ..., 140-N). In an exemplary embodiment of the inventive concept, the image sensor 150 is a complementary-metal-oxide-semiconductor (CMOS) image sensor (IS) and may also be referred to as a CIS, where C is short for CMOS. The image sensor 150 is not limited to being a CMOS image sensor, and in alternate embodiments may be another type of image sensor such as a charged-coupled-device (CCD) image sensor.

An imaging sub-system 130 of the application processor 110 may control the image sensor 150. The imaging sub-system 130 may send a request to the image sensor 150 after a user triggers a camera function or activates a camera (e.g., rear camera) of the mobile device, where the request causes the image sensor 150 to prepare high resolution image data. The imaging sub-system 130 includes a camera control interface (CCI) host 132, an image data interface 133-1 (ImData I/F), and a processor 134-1 (e.g., an image signal processing unit). The imaging sub-system 130 may additionally include a memory 136 used to store setting-files, each one defining a different operational mode (resolution, frame rate, internal configurations, etc.). The imaging sub-system 130 may store one or more drivers for each available CIS (e.g., CIS drivers). The processor 134-1 may drive the image sensor 150 using one of the CIS drivers. The CCI host 132 of the imaging sub-system 130 may control the image sensor 150 using a camera control interface (CCI). The CCI may use an I2C protocol, a serial peripheral interface (SPI) protocol, or an I3C protocol. The CCI host 132 may transmit a control signal (e.g., CCIdata) to the image sensor 150 using one of the above-described protocols. The ImData I/F 133-1 of the imaging sub-system 130 may receive raw image data (e.g., high resolution image data HiResImData1) from a CCI host 156 of the image sensor 150. Then, the processor 134-1 of the imaging sub-system 130 can process the raw image data. For example, the raw image data could be in a MIPI format.

The non-image sensors communicate across the sensor bus 160 with a sensor hub 120 of the application processor 110. In an exemplary embodiment, one of the non-image sensors is an ambient light sensor. For example, the ambient light sensor may output first sensor data SData1 indicating the amount of ambient light present across the sensor bus 160. In an exemplary embodiment, one of the non-image sensors is an inertial movement unit (IMU) that measures at least one of an applied force, an angular rate, or an orientation. The IMU may include a combination of accelerometers, gyroscopes, and magnetometers. For example, the IMU may output second sensor data sData2 indicating an amount of force applied to the mobile device across the sensor bus 160. Additional non-image sensors may be present to output additional sensor data sDataN. For example, the additional non-image sensors may include a motion sensor, a temperature sensor, an infrared sensor, or a barometer.

The sensor hub 120 may be referred to as an always-on sensor-hub. The sensor hub 120 may be a low-power island on the application processor 110. The sensor hub 120 may be optimized for working in an always-on mode. The sensor hub 120 collects data from the sensors, and analyses the collected data to determine whether a change of state is required on the application processor 110. Examples of the state change include waking from a sleep state or low-power state (i.e., a wake-up or entering a normal-power state), partially waking from a sleep or low power state (i.e., a partial wake-up), or entering the sleep or low-power state. For example, all components of the mobile device become enabled or receive power during a wake-up and only some of the components become enabled or receive power during the partial wake-up. For example, the sensor hub 120 could determine from the analysed data that the user has picked up, touched, or shaken the mobile device, and then inform the application processor 110 that it may need to exit the low-power state.

When the mobile device is in the low-power state, various components of the mobile device may be disabled so they do not consume power. However, the sensor hub 120 and the non-image sensors remain enabled during the low-power state and accordingly can exchange sensor data (e.g., SdataN) and control signals (e.g., Ctrl1, Ctrl2, ..., CtrlN) with one another.

The sensor hub 120 includes a sensor interface 122 (e.g., an interface circuit), a processor 124, and a memory 126. The processor 124 can run a driver to drive a corresponding one of the non-image sensors. The driving of a non-image sensor may include the sensor hub 120 sending one or more control signals (e.g., Ctrl1, Ctrl2, ..., CtrlN) across the sensor bus 160 to the non-image sensors. The sensor hub 120 receives the non-image sensor data (e.g., SdataN) through its sensor interface 122.

Unlike a traditional image sensor, the non-image sensors perform with ultra low power (ULP) consumption. According to an exemplary embodiment of the inventive concept, an image sensor is modified to include an ULP always-on (AON) ability (e.g., an AON mode), thereby generating image sensor 150. The image sensor 150 is capable operating in one of a CIS mode and the AON mode. The sensor hub 120 or the application processor 110 may set a register that indicates whether the image sensor 150 is to operate in the CIS mode or the AON mode. The image sensor 150 can then check that register periodically or as needed to determine which of the CIS mode or the AON mode to operate in. For example, a value of the register could include a first value indicating the CIS mode or a second other value indicating the AON mode. In an alternate embodiment, there is a first setfile for the AON mode and a second setfile for the CIS mode, and the sensor hub 120 loads the first setfile to cause the image sensor 150 to operate in the AON mode and loads the second setfile to cause the image sensor 150 to operate in the CIS mode. The setfiles may be stored in a memory such as memory 126.

In an exemplary embodiment, the register indicates the CIS mode when the mobile device is in a normal-power state and a user has a selected an application that triggers a camera function or a camera of the mobile device. In an exemplary embodiment, the register indicates the AON mode when the mobile device is in a low-power state.

When the image sensor 150 operates in the CIS mode, the image sensor 150 may generate high resolution raw image data (e.g., HiResImData1) and send the same to the imaging sub-system 130 through a camera serial interface (CSI) host 156. The imaging sub-system 130 may receive the HiResImData1 through its ImData I/F 133-1. In an exemplary embodiment, when the image sensor 150 operates in the AON mode, the image sensor 150 (e.g., a control I/F 155) sends low resolution image data (e.g., LoResImData) to the sensor bus 160, and the sensor hub 120 receives this data through its sensor I/F 122.

When the application processor 110 acts as a master and the image sensor 150 acts as a slave, the sensor hub 120 retrieves the LoResImData from the image sensor 150. When the image sensor 150 acts as a secondary-master, the image sensor 150 transfers the LoResImData to the sensor hub 120. The application processor 110 may send a first signal to the image sensor 150 informing the image sensor 150 it is to act as a secondary-master and second other signal to the image sensor 150 informing the image sensor 150 it is no longer to act as the secondary-master or it is to become a slave once more. Alternately, the application processor 110 may set a register with information indicating whether the image sensor 150 is to act as a secondary-master or slave, and the image sensor 150 can check this register to determine how to act.

In an exemplary embodiment, a power management integrated circuit (e.g., see 580 in FIG. 8) delivers a first amount of power to the image sensor 150 during the CIS mode and delivers a second amount of power to the image sensor 150 lower than the first amount during the AON mode.

The sensor hub 120 may process the sensor data (e.g., data from non-image sensors and/or the low resolution image data from CIS 150) it receives during a given period to determine whether the mobile device should exit from a low-power state or sleep state (e.g., wakeup). When the image sensor 150 is not present, the sensor hub 120 only receives sensor data from one or more of the non-image sensors. When the image sensor 150 is present, the sensor hub 120 may receive only the low resolution image data or both the low resolution image data and the non-image sensor data. In an exemplary embodiment, a size of the low resolution image data is less than a size of the high resolution image data. In an exemplary embodiment, if it is determined that a scene or background has changed from the low resolution image data, the sensor hub 120 may provide a status signal to the mobile device indicating it is to exit from the low-power state or sleep state. A scene or background change may be determined from comparing previous low resolution image data with newly received low resolution image data to determine a similarity value. For example, when the similarity value is less than a certain threshold value (i.e., not very similar to the prior image), it can be determined that the scene or background has changed. In an exemplary embodiment, the sensor hub 120 performs a face detection algorithm on the low resolution image data, and if a face has been detected), the sensor hub 120 may provide a status signal to the mobile device indicating it is to exit from the low-power state or sleep state.

The image sensor 150 may send the low resolution image data via a dedicated CCI port per driver of the application processor 110 or via a single physical port with different bus identifier (ID) addresses with the application processor 110. The image sensor 150 may send the low resolution image data via a CCI bus supporting multiple masters or use a single ID with two masters and different address maps or mode registers or the application processor may have an internal multiplexer mechanism between the drivers of the image sensor 150 and application processor 110. In an exemplary embodiment, the image sensor 150 may operate in the AON mode or the ULP mode, by reducing a sampling rate or sampling frequency.

Figure 2:
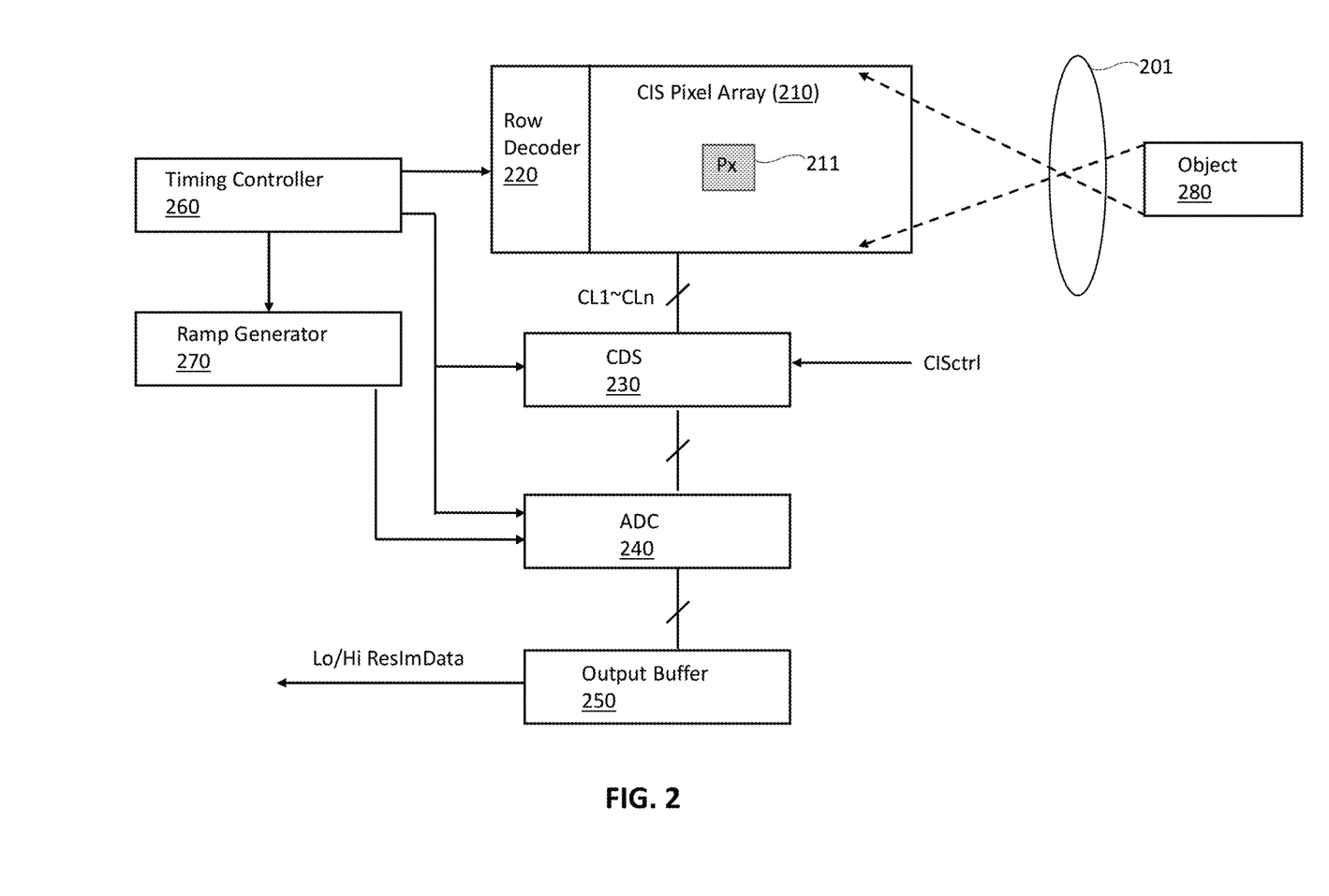
FIG. 2 is a block diagram of an image sensor of the mobile device, according to an exemplary embodiment of the inventive concept.

FIG. 2 illustrates a configuration of the image sensor 150 according to an exemplary embodiment of the inventive concept.

The image sensor 150 is configured to generate image data of an object 280 incident through a lens 201. The image sensor 150 includes a CIS pixel array 210, a row decoder 220, a correlated-double-sampler (CDS) 230, an analog-to-digital converter (ADC) 240, an output buffer 250, a timing controller 260, and a ramp generator 270.

The CIS pixel array 210 may include a plurality of CIS pixels (PX) 211 arranged in rows and columns. In an embodiment, each CIS pixel among the plurality of CIS pixels 211 may have a three transistor (3TR) pixel structure in which a pixel is implemented with three transistors, a four transistor (4TR) pixel structure in which a pixel is implemented with four transistors, or a five transistor (5TR) pixel structure in which a pixel is implemented with five transistors. Alternatively, at least two CIS pixels of the plurality of CIS pixels constituting the CIS pixel array 210 may share the same floating diffusion region FD (or a floating diffusion node). However, the structure of the CIS pixel is not limited to the above configuration.

The row decoder 220 may select and drive a row of the CIS pixel array 210. In an embodiment, the row decoder 220 decodes a row address and/or control signals that are output from the timing controller 260 and generates control signals for selecting and driving the row of the CIS pixel array 210 indicated by the row address and/or control signals. For example, the row decoder 220 may generate a select signal, a reset signal, and a transfer signal and may transmit the generated signals to pixels corresponding to the selected row.

The correlated-double sampler 230 may sequentially sample and hold a set of a reference signal and an image signal provided from the CIS pixel array 210 through column lines CL1 to CLn. In other words, the correlated-double sampler 230 may sample and hold levels of the reference signal and the image signal corresponding to each of columns. The correlated-double sampler 230 may provide the set of the reference signal and the image signal, which are sampled with regard to each column, to the analog-to-digital converter 240 under control of the timing controller 260.

The analog-to-digital converter 240 may convert a correlated-double sampling signal of each column output from the correlated-double sampler 230 into a digital signal. In an embodiment, the analog-to-digital converter 240 may compare the correlated-double sampling signal and a ramp signal output from the ramp generator 1270 and may generate a digital signal corresponding to a comparison result.

The output buffer 250 may temporarily store the digital signal provided from the analog-to-digital converter 240.

The timing controller 260 may control an operation of at least one of the CIS pixel array 210, the row decoder 220, the correlated-double sampler 230, the analog-to-digital converter 240, the output buffer 250, and the ramp generator 270.

The ramp generator 270 may generate the ramp signal and may provide the ramp signal to the analog-to-digital converter 240.

In an exemplary embodiment, the correlated-double sampler 230 receives the control signal CISctrl1, performs its sampling at a first frequency when the control signal CISctrl1 indicates the CIS mode and at a second frequency lower than the first frequency when the control signal CISctrl1 indicates the AON mode. Thus, the output buffer 250 outputs high resolution image data (e.g., HiResImData1) during the CIS mode and low resolution image data (e.g., LoResImData) during the AON mode.

Figure 3:
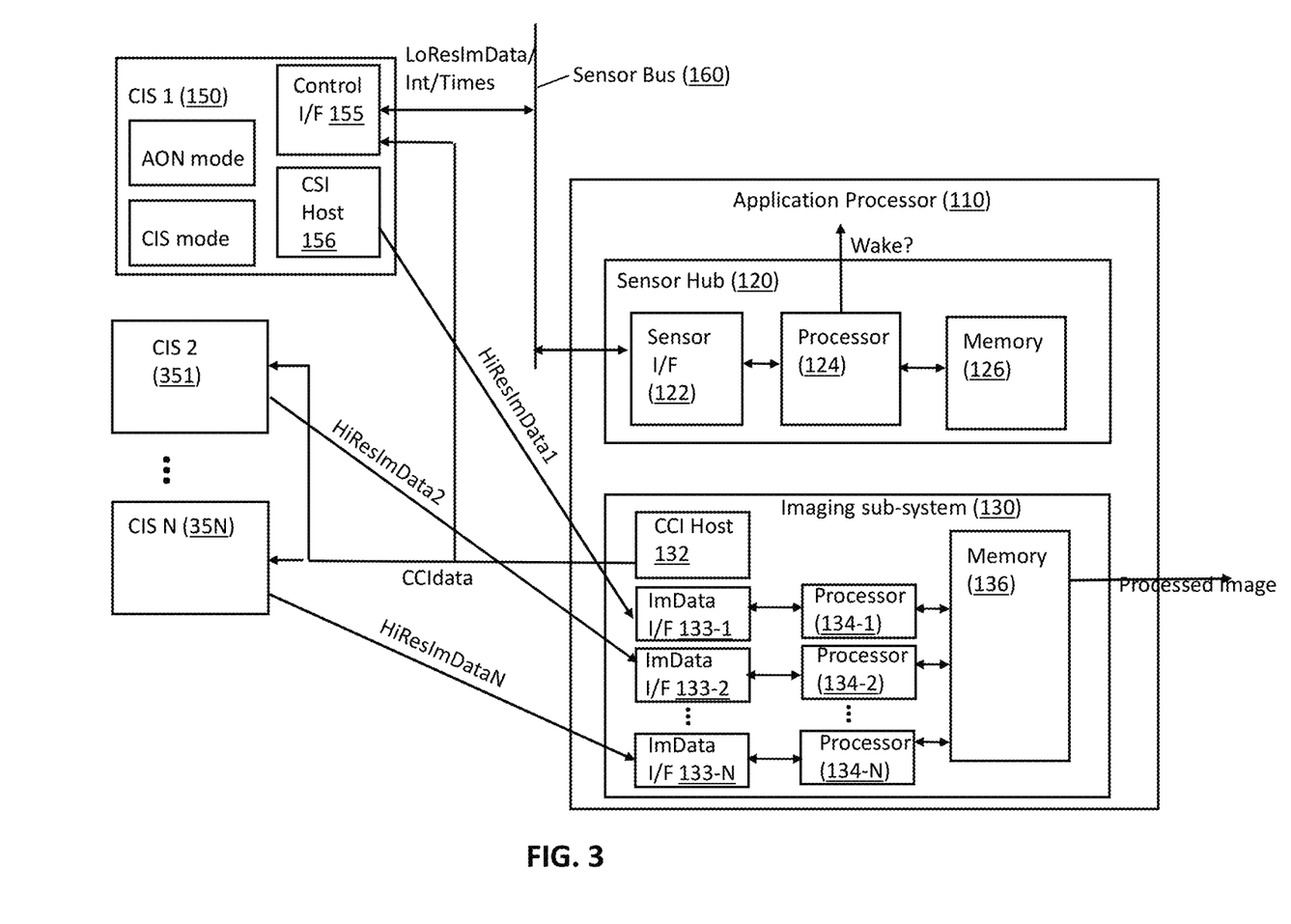
FIG. 3 is a block diagram of a portion of the mobile device, according to an exemplary embodiment of the inventive concept.

FIG. 3 illustrates a variation on the embodiment depicted in FIG. 1. Different from FIG. 1, the system includes one or more additional image sensors (e.g., 351, . . . , 35N). The additional image sensor(s) differ from the image sensor 150 in that they do not provide prepare low resolution image data to be accessed by the sensor hub 120. The additional image sensor(s) may prepare high resolution image data and provide the same to the imaging sub-system 130. For example, a second image sensor 351 may provide high resolution image data HiResImData2 to a second ImData I/F 133-2 of the imaging sub-system 130 and an N-th image sensor 35N may provide high resolution image data HiResImDataN to an N-th ImData I/F 133-N of the imaging sub-system 130. As shown in FIG. 3, additional processers (e.g., 134-2, . . . , 134-N) may be provided in the imaging sub-system 130 to respectively process the additional high resolution image data. In an alternate embodiment, only a single processor 134-1 is present to process all of the high resolution image data. Thus, the additional image sensors do not operate in an ULP or AON mode. In an alternate embodiment, one or more of the additional image sensors are configured in a manner similar to image sensor 150 to prepare a low resolution image data to be accessed by the sensor hub 120 through the sensor bus 160 and operate in an ULP or AON mode. For example, there may be N image sensors (e.g., a CIS) in total, from which only M image sensors function like image sensor 150 to perform in one of the AON mode and the CIS mode, where M is less than N. The CCI host 132 may transmit a first control signal (e.g., CCIdata) to the image sensor 150, a second control signal to the image sensor 351, and an N-th control signal to the N-th image sensor 35N using separate dedicated control lines, using one of the above-described CCI protocols. While FIG. 3 shows a single line connected to the CCI Host 132, in an alternate embodiment, this single line is replaced with separate lines each going to a different one of the image sensors 150, 351, . . . , 35N, to provide different CCIdata (e.g., a control signal) to each of the image sensors.

Figure 4:
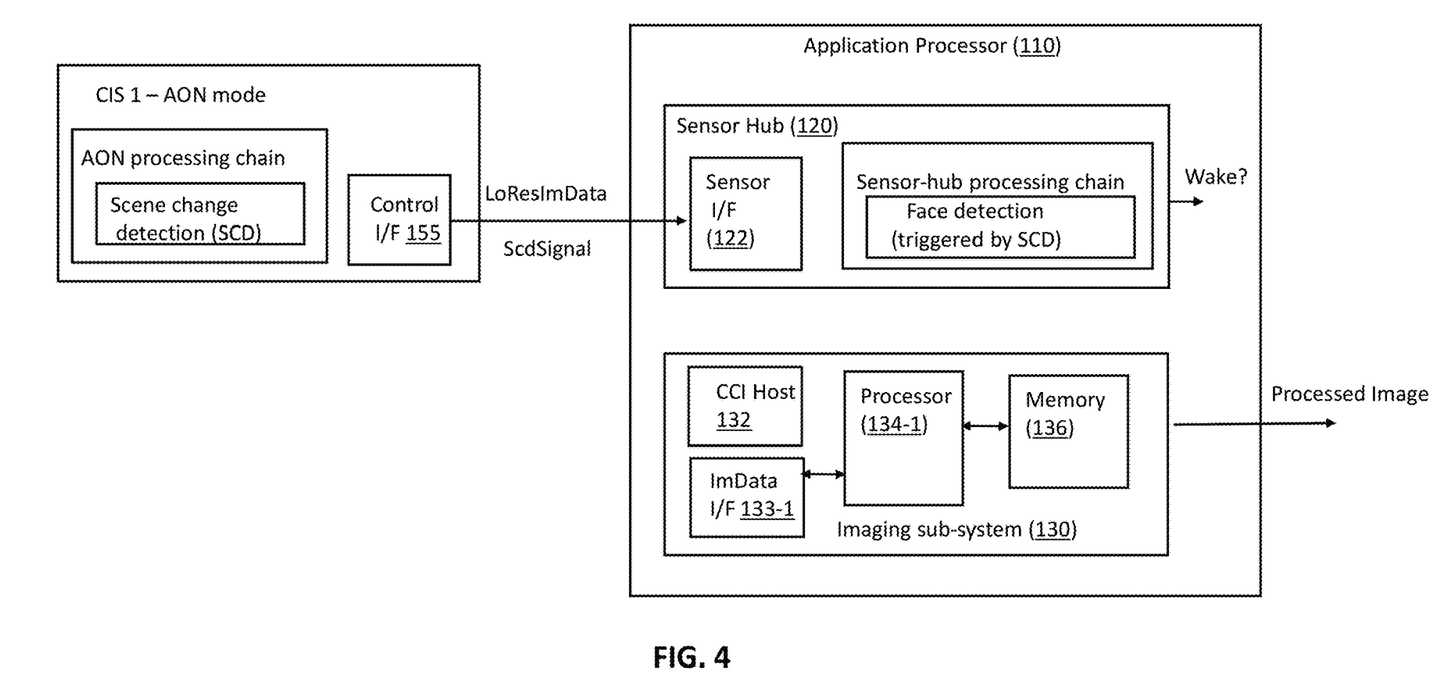
FIG. 4 illustrates an operation of the mobile device while an image sensor of the mobile device is in an AON mode, according to an exemplary embodiment of the inventive concept.

FIG. 4 illustrates an example of the image sensor 150 operating in the AON mode. In this example, the image sensor 150 determines whether a scene or background change has occurred based on an analysis of the low resolution image data. For example, the image sensor 150 may include a memory that retains previous low resolution image data, and the image sensor 150 may compare the previous low resolution image data with the current low resolution image data to determine whether a scene or background change has occurred. The image sensor 150 may send a scene change detection signal ScdSignal to the sensor hub 120 indicating whether the scene or background change has occurred. For example, a value in the scene change detection signal ScdSignal may be a first value to indicate a scene or background change has occurred and a second value different from the first value to indicate that a scene or background change has not occurred. In an exemplary embodiment, the ScdSignal being a first value triggers face detection by the sensor hub 120. Thus, the sensor hub 120 performs a face detection algorithm on the low resolution image data to detect a face. If a face is detected, the sensor hub 120 can output a signal indicating the mobile device should wake. If the sensor hub 120 is unable to detect a face, the mobile device may remain in its current state.

In an alternate embodiment, the scene and face detection are both performed on image sensor 150 or both performed on the application processor 110. In another embodiment, the image sensor 150 analyzes the low resolution image data to determine whether an amount of ambient light exceeds a certain threshold, and then the image sensor 150 informs the sensor hub 120 of whether the amount of ambient light exceeds the certain threshold. In this embodiment, when the amount of ambient light exceeds the certain threshold, the sensor hub 120 informs the application processor 110 of a wake state. The image sensor 150 may determine that the ambient light exceeds the threshold when an intensity or brightness of the low resolution image data exceeds a certain threshold. For example, an average brightness of the low resolution image data can be calculated from a brightness or color of image data of each pixel, and the average brightness can be compared to the certain threshold. In another embodiment, the sensor hub 120 analyzes the low resolution image data to determine whether the amount of ambient light exceeds a certain threshold and when the amount of ambient light exceeds the certain threshold, the sensor hub 120 informs the application processor 110 of a wake state.

Figure 5A:
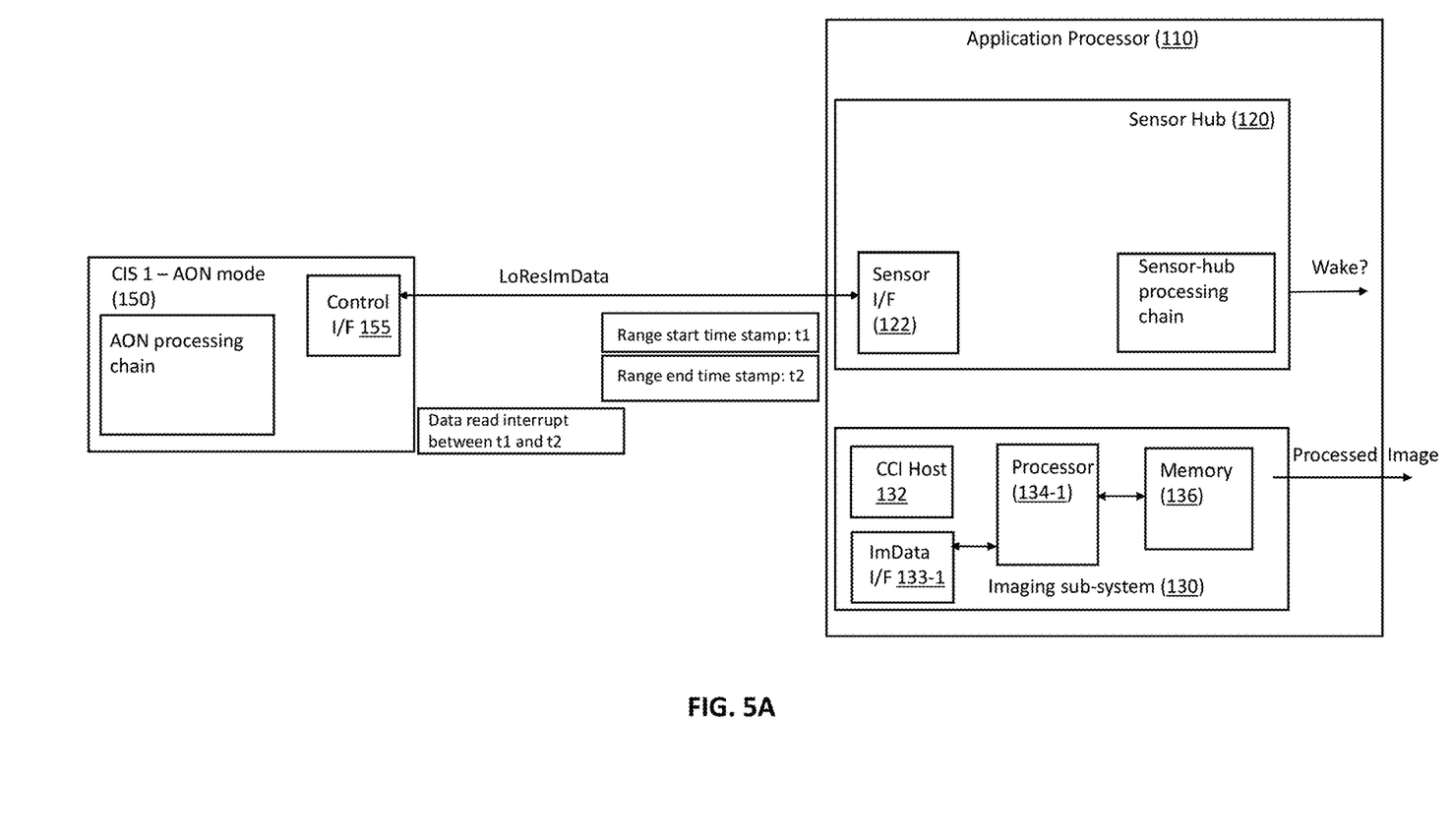
FIG. 5A illustrates a method for synchronizing the image sensor in the AON mode with an application processor of the mobile device, according to an exemplary embodiment of the inventive concept.

FIG. 5A illustrates the image sensor 150 being synchronized with the sensor hub 120 of the application processor 110 during the AON mode. Since the sensor hub 120 may not be ready to process the low resolution image data, the sensor hub 120 can inform the image sensor 150 of a start time t_st and an end time t_end during which it is capable of processing the low resolution image data. For example, the sensor hub 120 could send the start time and end times t_st and t_end to the image sensor 150 and set a register indicating that the image sensor 150 should switch to the AON mode. The image sensor 150 can then send an interrupt signal to the sensor hub 120 at a time between the start and end times t_st and t_end once it has created the current low resolution image data. The image sensor 150 can send the low resolution image data along with the interrupt to the sensor hub 120, or the sensor hub 120 can retrieve the low resolution image data from a memory of the image sensor 150 upon receiving the interrupt. For example, if the sensor hub 120 sends the start and end times t_st and t_end at time 0, the start time t_st is 5 and the end time t_end is 10, and the image sensor 150 creates the low resolution image data at time 3, the image sensor 150 would wait at least until time 5 to send the low resolution image data.

Figure 5B:
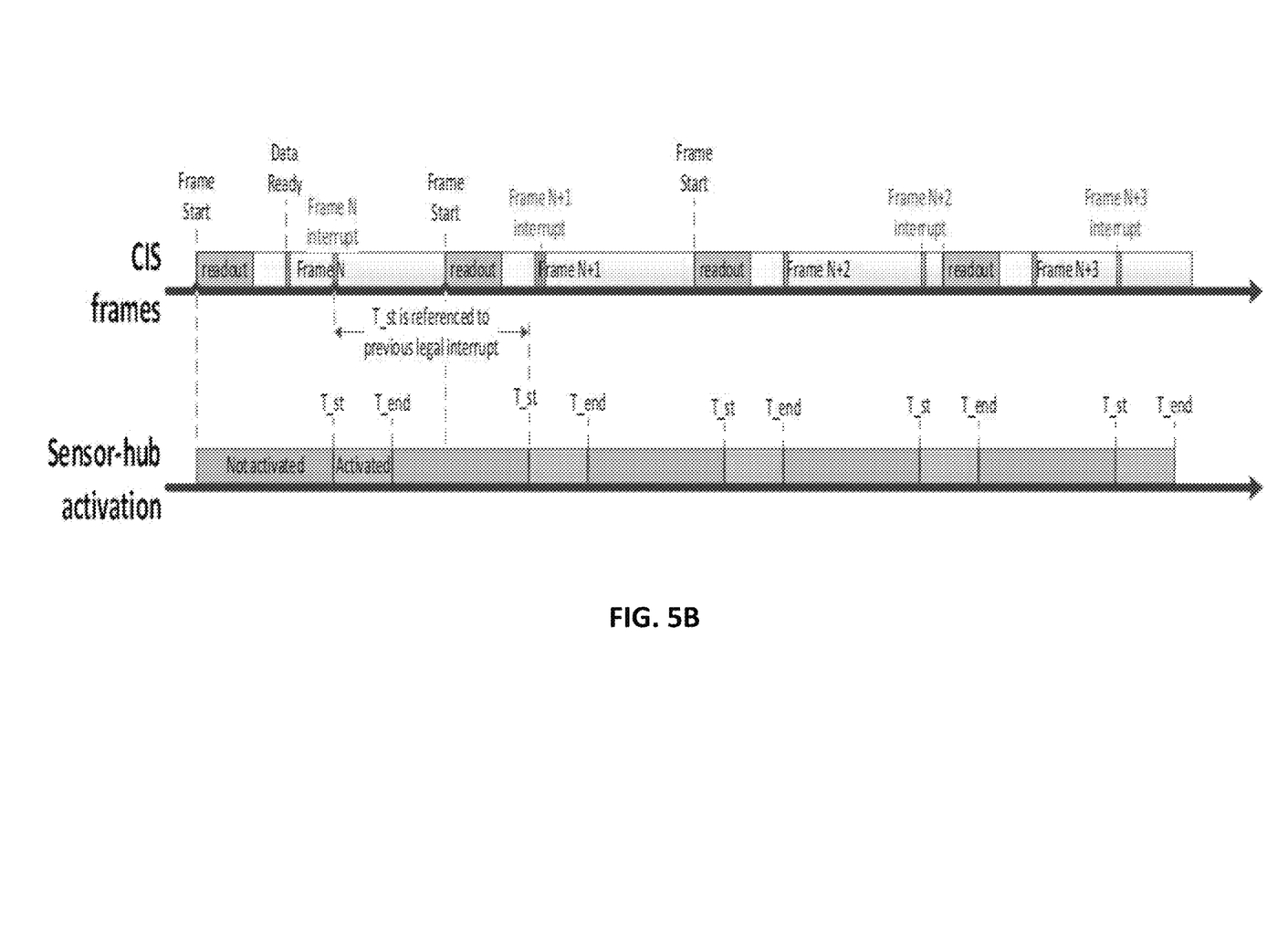
FIG. 5B includes an exemplary timing diagram for the method of FIG. 5A.

The image sensor 150 may periodically perform a readout to read data of the CIS pixels and then generate the low resolution image data of a current frame from the read data, during the AON mode. As shown in FIG. 5B, even though the low resolution image data for frame N (e.g., an AON frame) is ready at a time before the start time T_st, the image sensor 150 does not send the Nth interrupt to the sensor hub 120 until the start time T_st or a during an activation window of the sensor hub 120 between the start time T_st and the end time T_end. The sensor hub 120 may use the previously received interrupt as a zero reference. The interrupt may be shared on a separate line, or in the 13C case, as an In-Band interrupt.

Figure 6A:
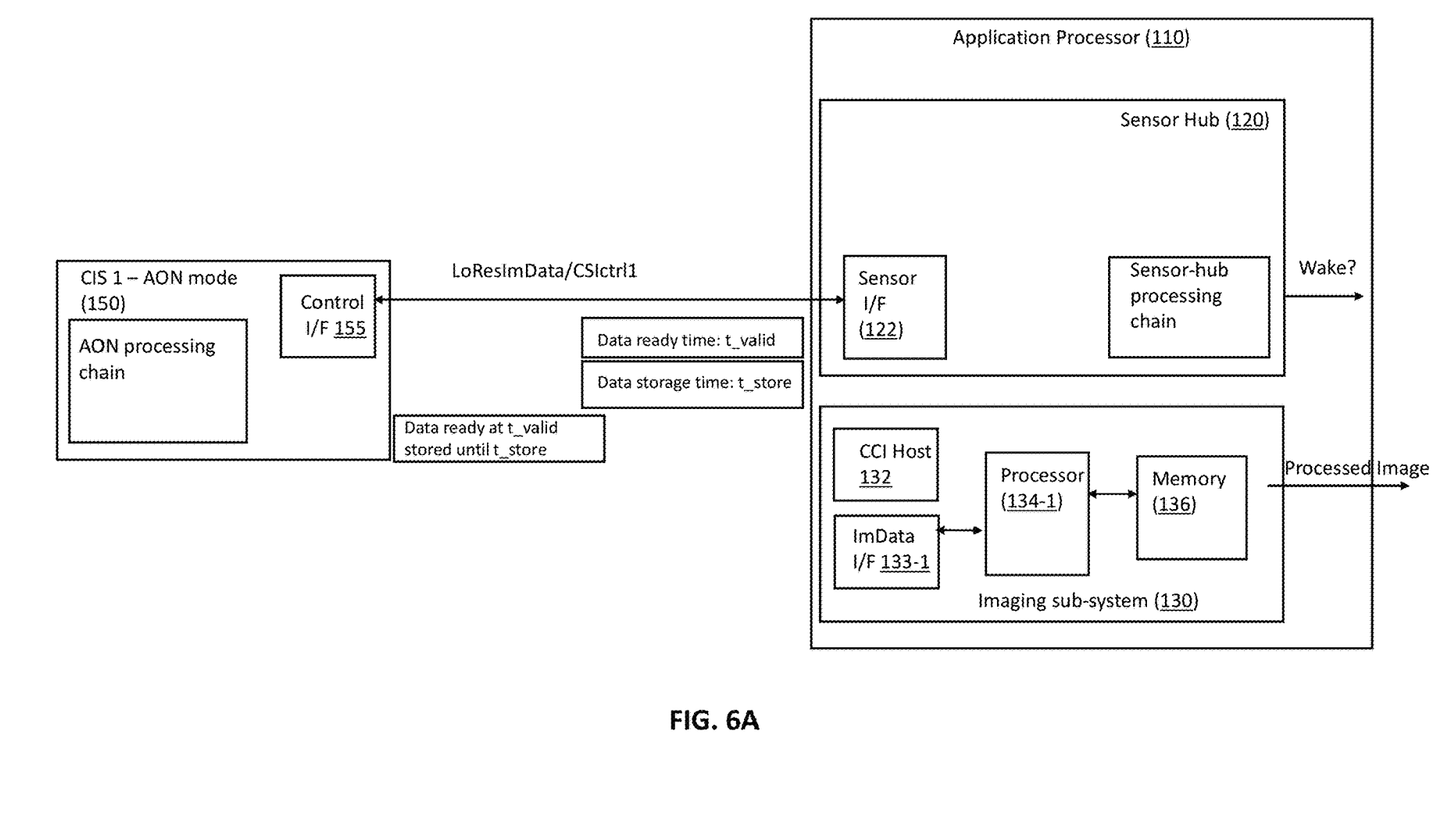
FIG. 6A illustrates a method for synchronizing the image sensor in the AON mode with an application processor of the mobile device, according to an exemplary embodiment of the inventive concept.
Figure 6B:
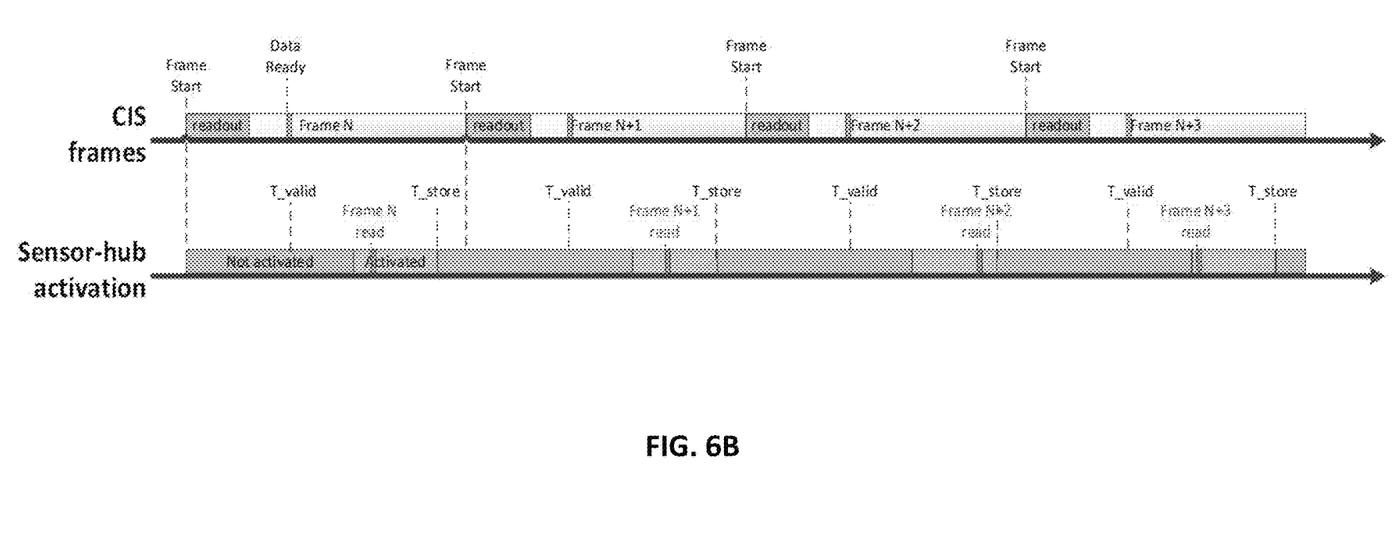
FIG. 6B includes an exemplary timing diagram for the method of FIG. 6A.

If the frame-rate is loose enough, and the full use case is deterministic in terms of processing time, an alternative method may be used. In the alternative method, a frame rate at which the image sensor 150 generates the low resolution image data is synchronized with a sensor hub activation frequency. The sensor hub 120 requests that the image sensor 150 prepares the data at time t_valid, and assumes the data is available by that time. The image sensor 150 will then hold the data until time t_store after time t_valid. As shown in FIG. 6A, the sensor hub 120 may send a signal (e.g., CSIctrl1) to the image sensor 150 to inform it of time t_valid and time t_store. The image sensor 150 needs to complete an operation to generate the low resolution image data before time t_valid occurs, and then retain this data at least until time t_store. As shown in FIG. 6B, even though the data is ready at time t_valid, the sensor hub 120 is not yet ready to process the data (i.e., not activated). However, then when the sensor hub 120 becomes ready to process the data (i.e., activated), the sensor hub 120 reads the data from the image sensor 150 corresponding to an Nth frame at a time that occurs before time t_store. After time t_store, the image sensor 150 may capture a new image and generate new corresponding low resolution image data.

Figure 7A:
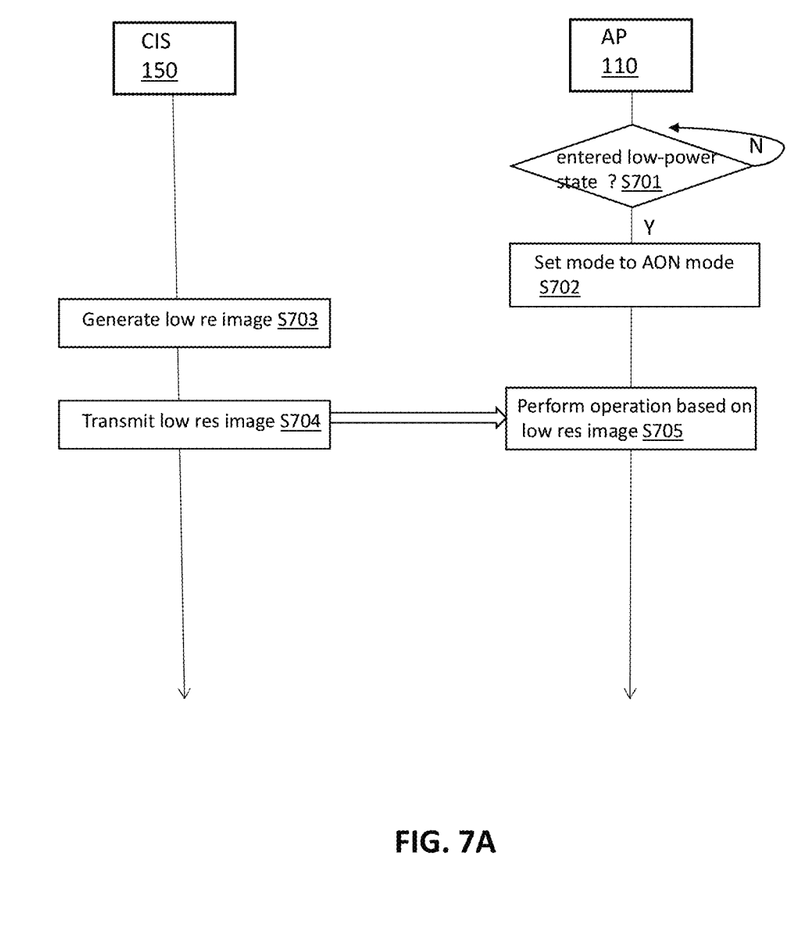
FIG. 7A illustrates a method of operating the mobile device, according to an exemplary embodiment of the inventive concept.

FIG. 7A illustrates a method of operating an image sensor according to an exemplary embodiment of the inventive concept. The method of FIG. 7A includes determining whether the mobile device has entered a low-power state (S701). In an exemplary embodiment, whenever the user presses a button of the mobile device that turns off the display, the mobile device enters the low-power state. The method of FIG. 7A further includes the sensor hub 120 setting a mode of the image sensor to an AON mode when it is determined that the mobile device has entered the low-power state (step S702). The method of FIG. 7A further includes the image sensor 150 generating low resolution image data in response to being set to the AON mode (step S703). In the AON mode, the image sensor 150 may periodically capture low resolution images to generate low resolution data. In an exemplary embodiment, a front camera of the mobile device rather than a rear camera of the mobile device is used to capture the low resolution image. The method of FIG. 7A further includes the image sensor 150 transmitting the low resolution image data to the application processor 110 (step 704). For example, the image sensor 150 may transmit the low resolution image data to the sensor I/F 122. In an alternate embodiment, the image sensor 150 may send an interrupt to the application processor 110 and the sensor hub 120 may retrieve the low resolution image data from the image sensor 150 in response to the interrupt as discussed above with respect to FIG. 5A and FIG. 5B. For example, the interrupt could be sent to the sensor I/F 122. In another alternate embodiment, the sensor hub 120 retrieves the low resolution image data from the image sensor 150 between times t_valid and t_store as discussed above with respect to FIG. 6A and FIG. 6B. The method of FIG. 7A further includes the sensor hub 120 performing an operation based on the low resolution image data (step 705). In an exemplary embodiment, the operation includes determining whether to wakeup the mobile device. For example, if the low resolution image data depicts a scene change or includes a face, the sensor hub 120 could notify the application processor 110 that it should wakeup or exit from a low-power or sleep state (e.g., enter a normal operation mode or enter a normal-power state). For example, the mobile device could turn on its display and present a user interface on the display upon exiting from the low-power or sleep state.

Figure 7B:
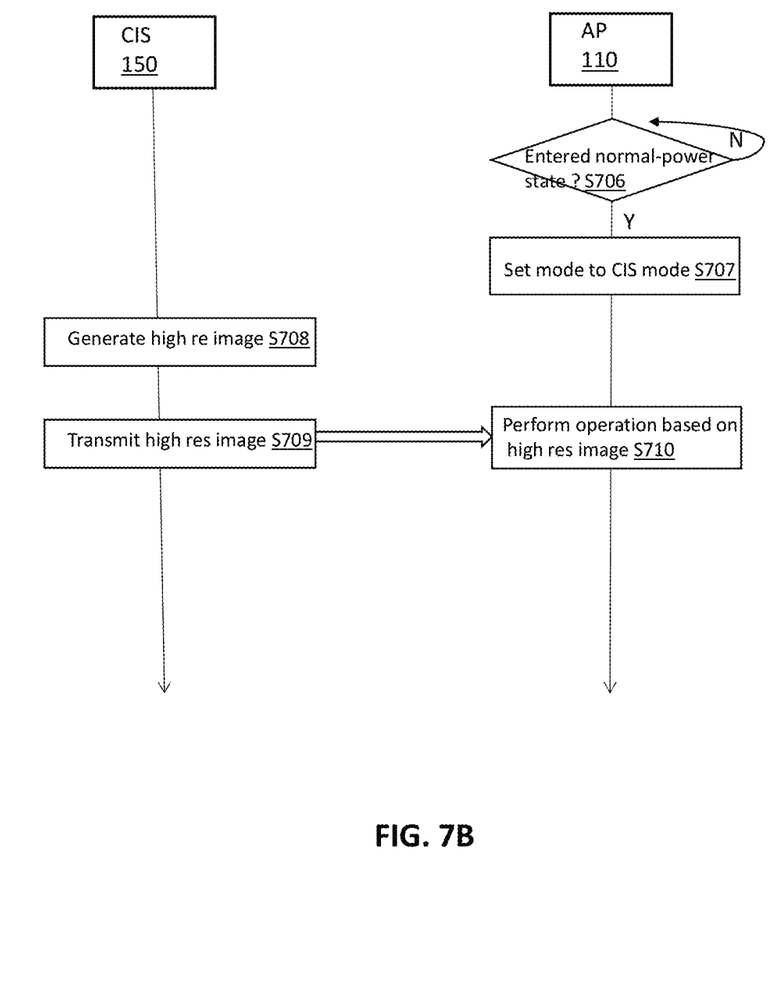
FIG. 7B illustrates a method of operating the mobile device, according to an exemplary embodiment of the inventive concept.

FIG. 7B illustrates a method of operating an image sensor according to an exemplary embodiment of the inventive concept. The method of FIG. 7B includes determining whether the mobile device has entered the normal-power state (step S706). If it is determined that the mobile device has entered the normal-power state, the method of FIG. 7B further includes the sensor hub 120 setting an operation mode of the image sensor 150 to a CIS mode (step S707). The method of FIG. 7B further includes the image sensor 150 generating high resolution image data in response to being set to the CIS mode (step 708). In the CIS mode, the image sensor 150 no longer periodically captures the low resolution images to be exchanged with the sensor hub 120. In an exemplary embodiment, once a user triggers a camera function of the mobile device that uses a rear camera of the mobile device during the CIS mode, the image sensor 150 captures high resolution images or high resolution image data, which are not shared with the sensor hub 120. The method of FIG. 7B further includes the image sensor 150 transmitting the high resolution image data to the application processor 110 (step 709). The method of FIG. 7B further includes the imaging subsystem 130 of the application processor 110 performing an operation on the high resolution image data (step S710).

Figure 8:
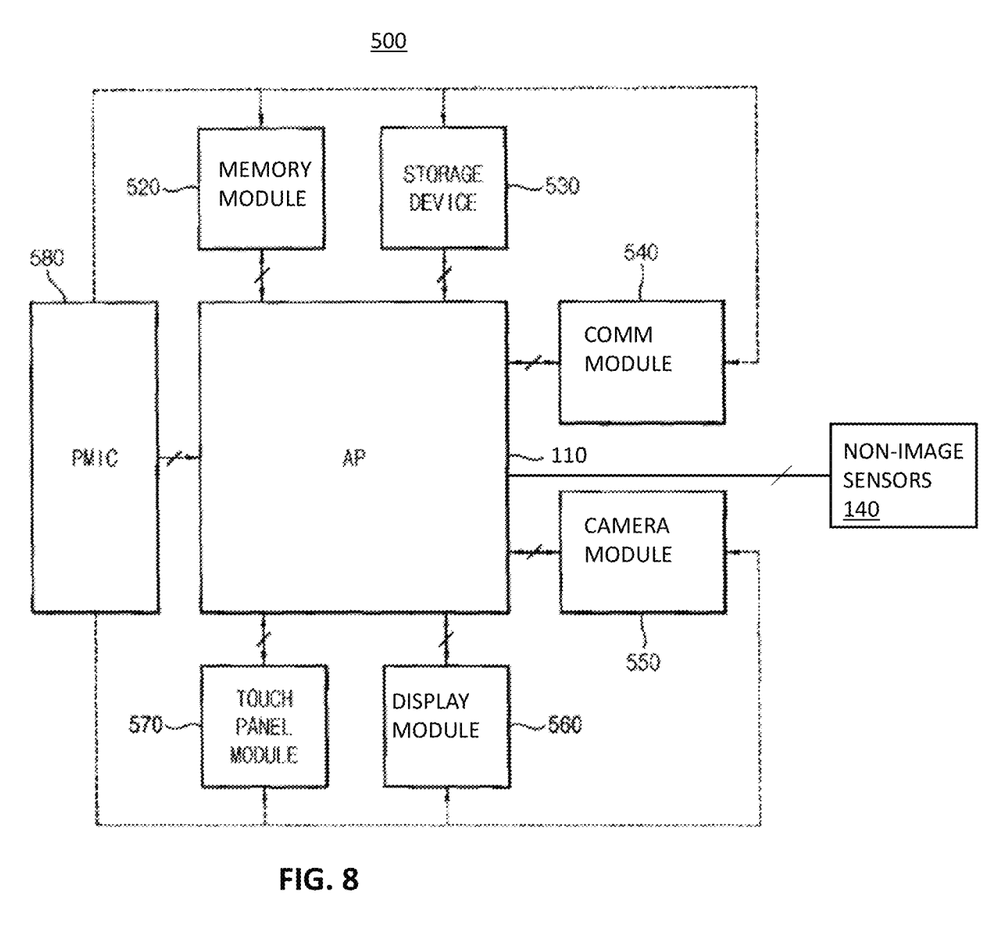
FIG. 8 is block diagram of the mobile device, according to an exemplary embodiment of the inventive concept.
Figure 9:
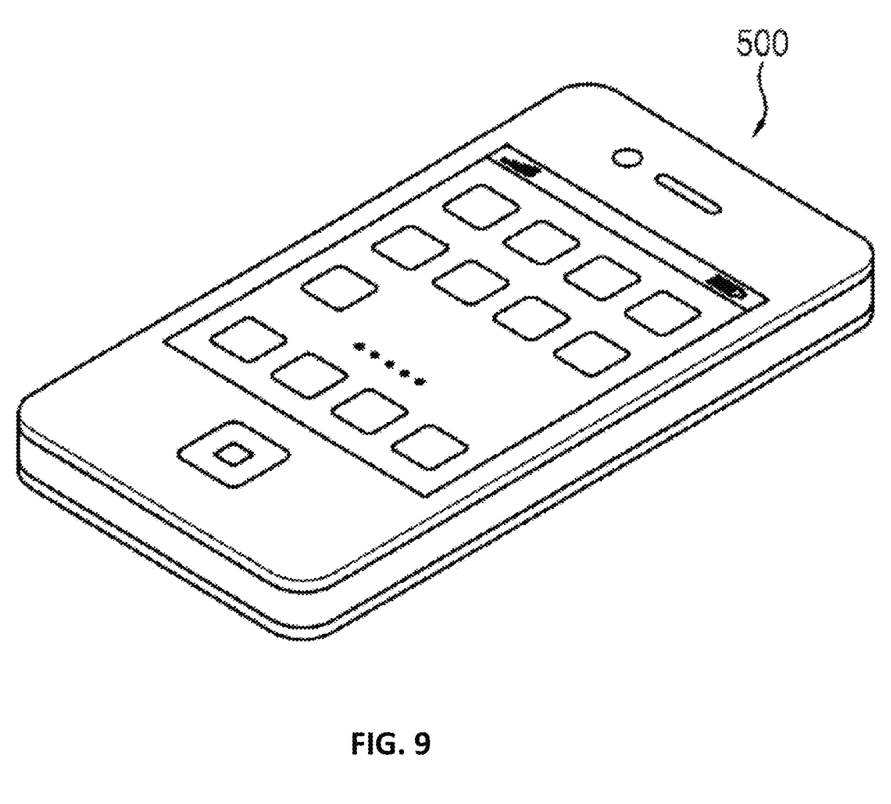
FIG. 9 illustrates an example of the mobile device.

FIG. 8 is a block diagram illustrating a mobile device according to an embodiment of the inventive concept. FIG. 9 is a diagram illustrating an example in which a mobile device of FIG. 8 is implemented as a smart-phone.

Referring to FIGS. 8 and 9, a mobile device 500 comprises an application processor 110, a memory device 520, a storage device 530, multiple functional modules 540, 550, 560, and 570, and a PMIC 580 that provides an operating voltage to application processor 110, memory device 520, storage device 530, functional modules 540, 550, 560, and 570, respectively, and non-image sensors 140. For example, as illustrated in FIG. 9, mobile device 500 may be implemented as a smart-phone.

Application processor 110 controls overall operations of mobile device 500. For instance, application processor 110 controls memory device 520, storage device 530, the non-image sensors, and the functional modules 540, 550, 560, and 570.

Application processor 110 may comprise a central processing unit that operates based on a clock signal, a clock generating unit that generates the clock signal to provide the clock signal to the central processing unit, and a clock management unit that predicts an operating state of the central processing unit, provides operating frequency information to PMIC 580 based on the predicted operating state of the central processing unit, and changes the operating frequency of application processor 510 based on the predicted operating state of the central processing unit. In an exemplary embodiment, the PMIC 580 changes an operating voltage of application processor 510 based on the operating frequency information indicating a change of the operating frequency of application processor 110.

Memory device 520 and storage device 530 store data for operations of mobile device 500. Memory device 520 may correspond to a volatile semiconductor memory device such as a dynamic random access memory (DRAM) device, a static random access memory (SRAM) device, a mobile DRAM, etc. In addition, storage device 530 may correspond to a non-volatile semiconductor memory device such as an erasable programmable read-only memory (EPROM)

device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In some embodiments, storage device 530 may correspond to a solid state drive (SSD) device, a hard disk drive (HDD) device, a CD-ROM device, etc.

Functional modules 540, 550, 560, and 570 perform various functions of mobile device 500. For example, mobile device 500 may comprise a communication module 540 that performs a communication function (e.g., a code division multiple access (CDMA) module, a long term evolution (LTE) module, a radio frequency (RF) module, an ultra wideband (UWB) module, a wireless local area network (WLAN) module, a worldwide interoperability for microwave access (WIMAX) module, etc.), a camera module 550 that performs a camera function, a display module 560 that performs a display function, a touch panel module 570 that performs a touch sensing function, etc. In an exemplary embodiment, the camera module 550 includes the image sensor 150 and/or image sensors 351-351N.

The inventive concept may be applied to an electronic device having an application processor. For example, the inventive concept may be applied to a computer, a laptop, a digital camera, a cellular phone, a smart-phone, a smart-pad, a personal digital assistants (PDA), a portable multimedia player (PMP), an MP3 player, a navigation system, a video camcorder, a portable game console, etc.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the exemplary embodiments may be physically separated into two or more interacting and discrete blocks, units and/or modules without departing from the scope of the inventive concept. Further, the blocks, units and/or modules of the exemplary embodiments may be physically combined into more complex blocks, units and/or modules without departing from the scope of the inventive concept.

Exemplary embodiments of the present invention may be embodied directly in hardware, in a software module executed by a processor, or in a combination of the two. A software module may be tangibly embodied on a non-transitory program storage device such as, for example, in RAM memory, flash memory, ROM memory, EPROM memory, EEPROM memory, registers, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an application specific integrated circuit (ASIC).

While the present inventive concept has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A mobile device comprising:
a sensor bus connected to at least one non-imaging sensor for receiving sensor data;
an application processor comprising an imaging subsystem including a first interface and a sensor hub including a second interface, the imaging subsystem configured to process high resolution image data received through the first interface;
an image sensor configured to operate in one of first and second modes,
wherein the image sensor is configured to capture the high resolution image data in response to a request from the imaging subsystem and the imaging subsystem is configured to perform a first operation on the high resolution image data received through the first interface, during the first mode,
wherein the image sensor is configured to capture the low resolution image data and output the low resolution data to the sensor bus, and
wherein the sensor hub is configured to perform a second operation using the low resolution image data and the sensor data received from the sensor bus through the second interface, during the second mode.

2. The mobile device of claim 1, wherein the image sensor operates in the second mode when the mobile device operates in a low-power state and operates in the first mode when the mobile device operates in a normal-power state.

3. The mobile device of claim 2, wherein the second operation determines whether a scene change has occurred from an analysis of the low resolution image data, and the application processor exits from the low-power state when it is determined that the scene change has occurred.

4. The mobile device of claim 2, wherein the second operation detects whether a face is present from an analysis of the low resolution image data, and the application processor exits from the low-power state when the face is detected.

5. The mobile device of claim 1, wherein the sensor hub detects whether a face is present in the low resolution image data upon the image processor determining a scene change has occurred from an analysis of the low resolution image data, during the second mode.

6. The mobile device of claim 1, wherein the first operation processes the high resolution image data to generate an image.

7. The mobile device of claim 1, wherein the at least one non-image sensor includes at least one of an inertial movement unit (IMU) and an ambient light sensor (ALS).

8. The mobile device of claim 1, wherein the sensor hub provides a time range to the image sensor indicating when it is ready to process the low resolution image data and the image processor provides an interrupt to the sensor hub during a time between the time range after generating the low resolution image data.

9. The mobile device of claim 1, wherein the sensor hub provides a valid time and a storage time to the image sensor, the image sensor completes preparation of the low resolution image data by the valid time and retains the prepared low resolution image data at least until the storage time, and the sensor hub retrieves the prepared low resolution image data from the image sensor between the valid time and storage time.

10. An application processor comprising:
   an imaging subsystem including a first interface, the imaging subsystem configured to process high resolution image received from an image sensor through the first interface during a first mode; and
   a sensor hub including a second interface connected to a sensor bus, the sensor hub configured to process sensor data received from at least one non-image sensor connected to the sensor bus through the second interface and low resolution image data received from an image sensor connected to the sensor bus through the second interface,
   wherein the sensor hub is configured to determine whether to exit a sleep state from an analysis of the sensor data and the low resolution image data during a second other mode.

11. The application processor of claim 10, wherein the application processor is located in a mobile device, the first mode occurs when the mobile device is in a normal-power state and the second mode occurs when the mobile device is in a low-power state.

12. The application processor of claim 10, wherein the sensor hub provides a time range to the image sensor indicating when it is ready to process the low resolution image data and the image processor provides an interrupt to the sensor hub during a time within the time range after generating the low resolution image data.

13. The application processor of claim 10, wherein the sensor hub provides a valid time and a storage time to the image sensor, the image sensor completes preparation of the low resolution image data by the valid time and retains the prepared low resolution image data at least until the storage time, and the sensor hub retrieves the prepared low resolution image data from the image sensor between the valid time and storage time.

14. A method of operating a mobile device including an image sensor and application processor, the method comprising:
   generating, by the image sensor, low resolution image data, when the mobile device is in a low-power state;
   generating, by the image sensor, high resolution image data, when the image sensor receives a request from the application processor and the mobile device is in a normal mode;
   performing, by the application processor, a first operation using sensor data received from a first bus connected to at least one non-image sensor and the low resolution image data received though the first bus, when the mobile device is in the low-power state; and
   performing, by the application processor, a second operation using the high resolution image data received through a second other bus, when the mobile device is in the normal-power state.

15. The method of claim 14, wherein the first operation determines whether to switch to the normal-power state.

16. The method of claim 15, wherein a sensor hub of the application processor provides a valid time and a storage time to the image sensor, the image sensor completes preparation of the low resolution image data by the valid time and retains the prepared low resolution image data at least until the storage time, and the sensor hub retrieves the prepared low resolution image data from the image sensor between the valid time and storage time, when the mobile device is in the low-power state.

* * * * *